United States Patent
Diao (10) Patent No.: US 11,256,919 B2
(45) Date of Patent: Feb. 22, 2022

(54) METHOD AND DEVICE FOR TERMINAL-BASED OBJECT RECOGNITION, ELECTRONIC DEVICE

(71) Applicants: Gree Electric Appliances (Wuhan) Co., Ltd, Hubei (CN); Gree Electric Appliances, Inc. of Zhuhai, Guangdong (CN)

(72) Inventor: Linlin Diao, Guangdong (CN)

(73) Assignees: Gree Electric Appliances (Wuhan) Co., Ltd, Wuhan (CN); Gree Electric Appliances, Inc. of Zhuhai, Zhuhai (CN)

( * ) Notice: Subject to any disclaimer, the term of this patent is extended or adjusted under 35 U.S.C. 154(b) by 234 days.

(21) Appl. No.: 16/614,539

(22) PCT Filed: Dec. 22, 2017

(86) PCT No.: PCT/CN2017/117906
§ 371 (c)(1),
(2) Date: Nov. 18, 2019

(87) PCT Pub. No.: WO2018/233254
PCT Pub. Date: Dec. 27, 2018

(65) Prior Publication Data
US 2020/0265235 A1 Aug. 20, 2020

(30) Foreign Application Priority Data
Jun. 21, 2017 (CN) .......................... 201710475462.2

(51) Int. Cl.
*G06K 9/62* (2006.01)
*G06K 9/00* (2022.01)
*H04N 5/232* (2006.01)

(52) U.S. Cl.
CPC ..... *G06K 9/00684* (2013.01); *G06K 9/00362* (2013.01); *G06K 9/00671* (2013.01); *H04N 5/23218* (2018.08); *H04N 5/232121* (2018.08)

(58) Field of Classification Search
CPC .. G06K 9/3241; G06K 9/3233; G06K 9/0063; G06K 9/20; G06K 9/4461; G06K 3/40; G06K 7/70
See application file for complete search history.

(56) References Cited

U.S. PATENT DOCUMENTS

2004/0066970 A1 * 4/2004 Matsugu .................. G06K 9/20
382/217
2009/0005961 A1 * 1/2009 Grabowski ............ G02B 27/01
701/532

(Continued)

FOREIGN PATENT DOCUMENTS

CN      101398527 B  *  9/2011
CN      103853315 A     6/2014

(Continued)

OTHER PUBLICATIONS

International Search Report, dated Feb. 26, 2018, in International application No. PCT/CN2017/117906, filed on Dec. 22, 2017.

*Primary Examiner* — Guillermo M Rivera-Martinez
(74) *Attorney, Agent, or Firm* — McAndrews, Held & Malloy, Ltd.

(57) ABSTRACT

The present disclosure relates to the technical field of terminals, and particularly relates to a method and device for terminal-based object recognition, and an electronic device. The method includes: receiving a function instruction for simulated magnifier input to a terminal by a user; activating a camera of the terminal according to the function instruction for simulated magnifier; determining an object to be recognized based on an object photographed by the camera; acquiring a physical distance between the object to be (Continued)

recognized and the camera, and acquiring a preset focal length corresponding to the physical distance; generating, according to the preset focal length, a first image corresponding to the object to be recognized, and displaying the first image; performing image processing and image recognition on the first image; and displaying information of the object to be recognized at the terminal according to a result of image processing and image recognition.

17 Claims, 5 Drawing Sheets

(56) References Cited

U.S. PATENT DOCUMENTS

| | | | | |
|---|---|---|---|---|
| 2009/0096879 | A1* | 4/2009 | Motomura | H04N 5/23248 348/208.6 |
| 2009/0128644 | A1* | 5/2009 | Camp, Jr. | H04N 5/225 348/218.1 |
| 2011/0249173 | A1* | 10/2011 | Li | H04N 5/23212 348/349 |
| 2013/0050432 | A1* | 2/2013 | Perez | G06F 3/017 348/47 |
| 2013/0117025 | A1 | 5/2013 | Park et al. | |
| 2013/0272569 | A1* | 10/2013 | Yumbe | G06K 9/0063 382/103 |
| 2015/0116547 | A1* | 4/2015 | Laroia | H04N 5/2254 348/240.1 |
| 2016/0021316 | A1* | 1/2016 | Tsubusaki | H04N 5/23219 348/240.1 |
| 2016/0065832 | A1* | 3/2016 | Kim | H04N 13/128 348/207.11 |
| 2016/0112652 | A1* | 4/2016 | David | H04N 5/2628 348/239 |
| 2016/0150950 | A1* | 6/2016 | Yu | A61B 3/14 351/206 |
| 2017/0109019 | A1* | 4/2017 | Lei | G06F 1/163 |

FOREIGN PATENT DOCUMENTS

| | | | |
|---|---|---|---|
| CN | 204964869 U | | 1/2016 |
| CN | 106778500 A | | 5/2017 |
| CN | 107465868 A | | 12/2017 |
| CN | 103853315 B | * | 3/2018 |
| CN | 109088996 A | * | 12/2018 |

* cited by examiner

Fig. 1

An object indication instruction input to the terminal by the user is received, and the object to be recognized is determined according to the object indication instruction

METHOD AND DEVICE FOR TERMINAL-BASED OBJECT RECOGNITION, ELECTRONIC DEVICE

This application is a 371 of International Patent Application No. PCT/CN2017/117906, filed Dec. 22, 2017, which claims benefit of Chinese Patent Application No. CN 201710475462.2, filed to the China Patent Office on Jun. 21, 2017, entitled "Terminal-Based Object Recognition Method, Device and Electronic Equipment," contents of both of which are hereby incorporated by reference in their entirety.

TECHNICAL FIELD

The present disclosure relates to the technical field of terminals, and particularly relates to a method and device for terminal-based object recognition, and an electronic device.

BACKROUND

At present, with the popularity of communication, various terminal devices have become very popular, such as mobile phones, and mobile phones are basically used by young people and the elderly. At the same time, various types of applications are derived from terminals, including applications that integrate a magnifier function, which can be used by users who need to use the magnifier function.

In the process of implementing the present disclosure, the inventors have found that the method know to the inventors has the following problems: a terminal integrated with a magnifier function in the method know to the inventors can only enlarge the appearance of an object, and cannot recognize the enlarged object itself.

SUMMARY

According to a first aspect of the embodiments of the present disclosure, a method for terminal-based object recognition is provided, which includes:

a function instruction for simulated magnifier input to a terminal by a user is received;

a camera of the terminal is activated according to the function instruction for simulated magnifier;

an object to be recognized is determined based on an object photographed by the camera;

a physical distance between the object to be recognized and the camera is acquired, and a preset focal length corresponding to the physical distance is acquired;

a first image corresponding to the object to be recognized is generated according to the preset focal length, and the first image is displayed;

image processing and image recognition are performed on the first image;

information of the object to be recognized is displayed at the terminal according to a result of image processing and image recognition.

According to some example embodiments, when the object photographed by the camera includes at least two objects, the step of determining the object to be recognized includes:

an object indication instruction input to the terminal by the user is received, and the object to be recognized is determined according to the object indication instruction.

According to some example embodiments, before performing image processing and image recognition on the first image, the method further includes:

an adjustment instruction input by the user based on the first image is received, and the size of the preset focal length is adjusted according to the adjustment instruction to adjust the size of the first image to generate a second image;

a focal length corresponding to the second image is stored, and the focal length corresponding to the physical distance is adjusted to the focal length corresponding to the second image.

The step of performing image processing and image recognition on the first image specifically includes that: image processing and image recognition are performed on the second image.

According to some example embodiments, after acquiring the physical distance between the object to be recognized and the camera and acquiring the preset focal length corresponding to the physical distance, the method further includes:

light intensity information of an environment surrounding the object to be recognized is acquired;

it is judged whether the light intensity information satisfies a preset light intensity range;

if the light intensity information does not satisfy the preset light intensity range, a light source device of the terminal is activated, and the light intensity of the light source device is adjusted.

The step of generating, according to the preset focal length, the first image corresponding to the object to be recognized and displaying the first image specifically includes that: the first image corresponding to the object to be recognized is generated according to the preset focal length under the light intensity of the light source device, and the first image is displayed.

According to some example embodiments, when the object to be recognized is a plant or an animal, the displayed information of the object to be recognized includes a name, a category, a growth habit, a habitat distribution, and a cultivation method.

According to a second aspect of the embodiments of the present disclosure, a device for terminal-based object recognition is provided, which includes:

a first receiving element, configured to receive a function instruction for simulated magnifier input to a terminal by a user;

an activating element, configured to activate a camera of the terminal according to the function instruction for simulated magnifier;

a determination element, configured to determine an object to be recognized based on an object photographed by the camera;

a first acquisition element, configured to acquire a physical distance between the object to be recognized and the camera, and acquire a preset focal length corresponding to the physical distance;

a magnifying element, configured to generate, according to the preset focal length, a first image corresponding to the object to be recognized, and display the first image;

a processing element, configured to perform image processing and image recognition on the first image; and a display element, configured to display information of the object to be recognized at the terminal according to a result of image processing and image recognition.

According to some example embodiments, when the object photographed by the camera includes at least two objects, the determination element is configured to receive an object indication instruction input to the terminal by the user, and determine the object to be recognized according to the object indication instruction.

According to some example embodiments, before performing image processing and image recognition on the first image, the device further includes:

a second receiving element, configured to receive an adjustment instruction input by the user based on the first image, and adjust the size of the preset focal length according to the adjustment instruction to adjust the size of the first image to generate a second image; and a first adjustment element, configured to store a focal length corresponding to the second image, and adjust the focal length corresponding to the physical distance to the focal length corresponding to the second image; and the processing element is configured to perform image processing and image recognition on the second image.

According to some example embodiments, after acquiring the physical distance between the object to be recognized and the camera and acquiring the preset focal length corresponding to the physical distance, the device further includes:

a second acquisition element, configured to acquire light intensity information of an environment surrounding the object to be recognized;

a judging element, configured to judge whether the light intensity information satisfies a preset light intensity range; and a second adjustment element, configured to activate, if the light intensity information does not satisfy the preset light intensity range, a light source device of the terminal, and adjust the light intensity of the light source device; and the magnifying element is configured to generate, according to the preset focal length, the first image corresponding to the object to be recognized under the light intensity of the light source device, and display the first image.

According to some example embodiments, when the object to be recognized is a plant or an animal, the displayed information of the object to be recognized includes a name, a category, a growth habit, a habitat distribution, and a cultivation method.

According to a third aspect of the embodiments of the present disclosure, an electronic device is provided, which includes: at least one processor; and a memory communicatively connected to the at least one processor, wherein the memory stores an instruction executable by the at least one processor, and the instruction may be executed by the at least one processor such that the at least one processor performs the method as mentioned above.

According to a fourth aspect of the embodiments of the present disclosure, a storage medium is provided, which includes a stored program. When the program is running, a device where the storage medium is located is controlled to perform the above method for terminal-based object recognition.

According to a fifth aspect of the embodiments of the present disclosure, a processor is provided. The processor is configured to run a program. The program is running to perform the above method for terminal-based object recognition.

BRIEF DESCRIPTION OF THE DRAWINGS

The one or more embodiments are exemplified by the pictures in the corresponding drawings, and the exemplary descriptions do not constitute a limitation to the embodiments. Elements having the same reference numerals in the drawings are denoted by similar elements, and unless otherwise stated, the figures in the drawings do not constitute a proportional limitation.

DETAILED DESCRIPTION OF THE EMBODIMENTS

The following is a description of some of the various possible embodiments of the present disclosure, which are intended to provide a basic understanding of the present disclosure and are not intended to confirm key or critical elements of the present disclosure or the scope of the claimed. It is to be understood that according to the technical solutions of the present disclosure, those of ordinary skill in the art can propose other implementation modes that are interchangeable without departing from the spirit of the present disclosure. Therefore, the following specific embodiments and the drawings are exemplary descriptions of the technical solutions of the present disclosure, and are not to be construed as a whole or as a limitation on the scope of the present disclosure.

Figure 1:
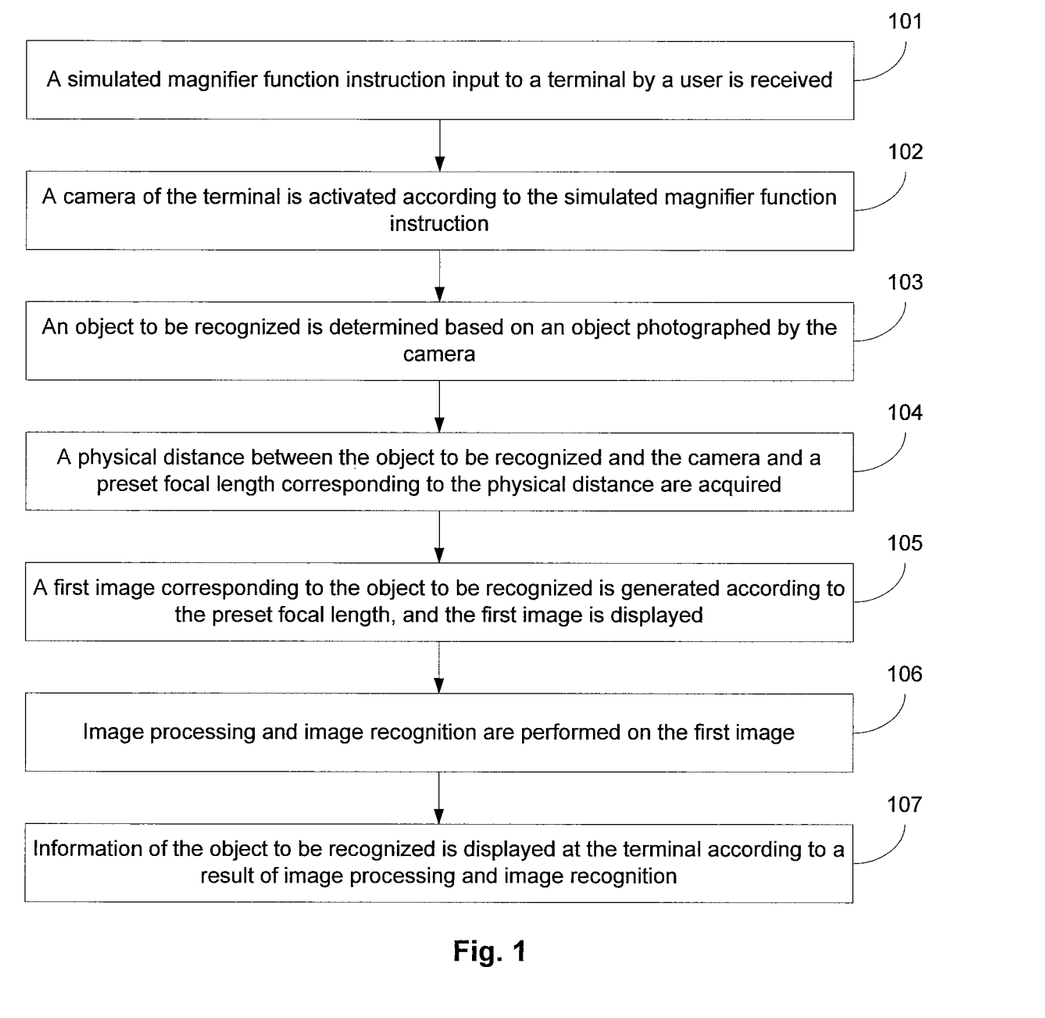
FIG. 1 is a flowchart of a method for terminal-based object recognition according to a first embodiment of the present disclosure.

Please refer to FIG. 1. FIG. 1 is a flowchart of a method for terminal-based object recognition according to a first embodiment of the present disclosure. As shown in FIG. 1, the method includes:

Step 101: A function instruction for simulated magnifier input to a terminal by a user is received.

The function instruction for simulated magnifier is used to enable the terminal to have a magnifier function, and with the magnifier function, the user can conveniently view a small object or a small text through the terminal.

The user may operate a preset key under a camera function of the terminal to trigger the function instruction for simulated magnifier, and the user may also operate an application on the terminal to input the function instruction for simulated magnifier to the terminal.

Step 102: A camera of the terminal is activated according to the function instruction for simulated magnifier.

After the terminal receives the function instruction for simulated magnifier, a processor of the terminal controls the camera of the terminal to be activated according to the instruction. At this time, the camera is in a working mode of the magnifier function, and the user may use the magnifier function of the terminal when the camera is in the working mode.

Step 103: An object to be recognized is determined based on an object photographed by the camera.

It can be understood that after the camera of the terminal is activated, the camera can photograph an image of an object within a certain range. The image within the certain range contains one or more objects. When there is one object to be recognized, it is necessary to first determine a specific object to be recognized.

Figure 2:
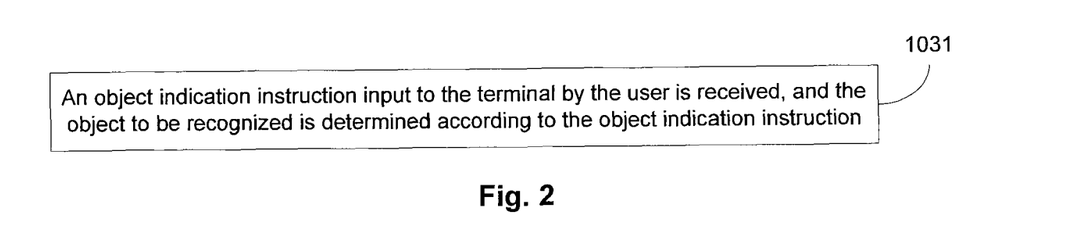
FIG. 2 is a flowchart of a method for determining an object to be recognized in the method for terminal-based object recognition according to a first embodiment of the present disclosure.

Therefore, when there is only one photographed object, it is determined that the photographed object is the object to be recognized. When the object photographed by the camera includes at least two objects, as shown in FIG. 2, the step of determining the object to be recognized includes:

Step 1031: An object indication instruction input to the terminal by the user is received, and the object to be recognized is determined according to the object indication instruction.

Here, the user may input the object indication instruction by operating a terminal screen or by voice.

For example, multiple objects photographed by the camera are displayed on the terminal screen, and an indication box appears at any position on the screen. When the indication box corresponds to the object to be recognized, the user clicks the indication box to trigger the object indication instruction, so that the terminal determines the object to be recognized. When an object indicated by the indication box is not the object to be recognized, the user may move the indication box to the object to be recognized by touching the screen, and the object to be recognized is framed. At this time, the terminal receives the object indication instruction, thereby determining the object to be recognized.

For example, multiple objects photographed by the camera are displayed on the terminal screen, the user may inform the terminal of a name keyword of the object to be recognized currently by inputting a voice, and the terminal performs semantic analysis and voice recognition according to the name keyword, thereby determining the object to be recognized.

Step 104: A physical distance between the object to be recognized and the camera and a preset focal length corresponding to the physical distance are acquired.

After determining the object to be recognized, an object distance between the object to be recognized and the camera is further acquired, and a preset focal length is acquired according to the object distance.

A distance sensor or an infrared sensor disposed on the terminal may be configured to acquire the object distance between the object to be recognized and the camera. The specific process of detecting the distance by the distance sensor or the infrared sensor is introduced in the method know to the inventors, and details are not described here.

After acquiring the object distance between the object to be recognized and the camera, the focal length corresponding to the physical distance may be acquired by finding a preset distance focal length database, thereby determining the focal length as the preset focal length under the current physical distance. The distance focal length database is pre-established, and includes a default correspondence between a physical distance and a focal length. One object distance may be corresponding to one focal length data (for example, a focal length corresponding to a physical distance of 1 m is 50 mm). Or, one physical distance range may be corresponding to one focal length data (for example, a focal length corresponding to a physical distance in the range of 0.5 m to 1.5 m is 50 mm).

Step 105: A first image corresponding to the object to be recognized is generated according to the preset focal length, and the first image is displayed.

After acquiring the preset focal length, the camera of the terminal photographs the object to be recognized at the preset focal length, thereby generating the first image, and displaying the first image on the terminal screen.

The magnification of the first image is related to the preset focal length. For example, in the case where the physical distance is constant, the focal length is 20 mm when the object to be recognized photographed under normal conditions, and when the preset focal length is 30 mm, the image to be recognized displayed on the screen is magnified relative to an image photographed under normal conditions.

The method for changing the focal length of the camera is digital zoom. The digital zoom refers to increasing the area of each pixel in a picture by the processor of the terminal to achieve the purpose of magnification.

Step 106: Image processing and image recognition are performed on the first image.

In the present embodiments, image processing and image recognition are performed on the first image, and by processing, analyzing and understanding the first image, it is recognized what the object to be recognized in the image is.

The image processing mainly refers to image conversion (such as grayscale and de-noising), image segmentation (such as threshold-based segmentation or gradient-based segmentation), and region morphology processing.

There are many methods for image recognition, including a shape feature based recognition technology, a color feature based recognition technology and a texture feature based recognition technology. From the difference in the mode feature selection and discriminant decision-making methods, the method for image recognition also includes a statistical pattern recognition method and a structural pattern recognition method. In addition, fuzzy pattern recognition methods and neural network pattern recognition methods are also widely used in image recognition.

In the present embodiments, the first image may be processed by the methods for image processing and image recognition described in the method know to the inventors, thereby recognizing the first image.

Step 107: Information of the object to be recognized is displayed at the terminal according to a result of image processing and image recognition.

After the first image is recognized, the related information of the object to be recognized in the first image may be acquired by accessing a cloud server or an external network, and the related information is displayed to the user on the terminal screen. The cloud server may pre-store related information of various objects.

The method for terminal-based object recognition of some embodiments of the present disclosure is described below by an example.

For example, a user views a red flower on a roadside tree by activating a simulated magnifier function of a terminal, and there are many photographed scenes displayed on a terminal screen, including flowers and leaves. At this time, the user can determine a specific red flower to be viewed according to an instruction input by the user, a current focal length is acquired by combining a physical distance between the current user and the red flower, an image under the focal length is generated, the red flower is recognized as bombax malabaricum by processing and analyzing the image, and information related to bombax malabaricum is displayed to the user, which may be: Chinese name: kapok or bombax ceiba, belonging to bombacaceae, angiospermae, and dicotyledoneae. It is distributed in the southwestern provinces and Taiwan province of China, and is also distributed in Vietnam, India and Myanmar. It is preferred to grow in warm, dry and sunny environments, and it is cold-intolerant and slightly moisture-tolerant, and avoids accumulation of water. It is drought-tolerant, anti-pollution, wind-resistant, and fast-growing, and has deep root and strong sprouting ability. The growth temperature is 20° C. to 30° C., and the winter temperature is not lower than 5° C. It is suitable for deep, fertile and well-drained neutral or slightly acidic sandy soil.

In some embodiments, when the object to be recognized is text information, such as a small foreign text on a bottle, the photographed first image is an image containing the foreign text. In the image recognition process, the recognized foreign text may be translated into Chinese and displayed on the terminal screen, and the translated text information may be displayed after being magnified. Therefore, not only the user with poor eyesight is able to view the small text, but also the user can understand the meaning of the small text, thereby fully improving the user experience.

The embodiments of the present disclosure provide a method for terminal-based object recognition. A simulated magnifier function is provided on a terminal, and image processing and image recognition are performed on a magnified image of an object to be recognized, thereby acquiring related information of the object to be recognized. The implementation mode not only facilitates object viewing by a user, but also helps the user to thoroughly understand related information of an object, thereby improving the user experience.

Figure 3:
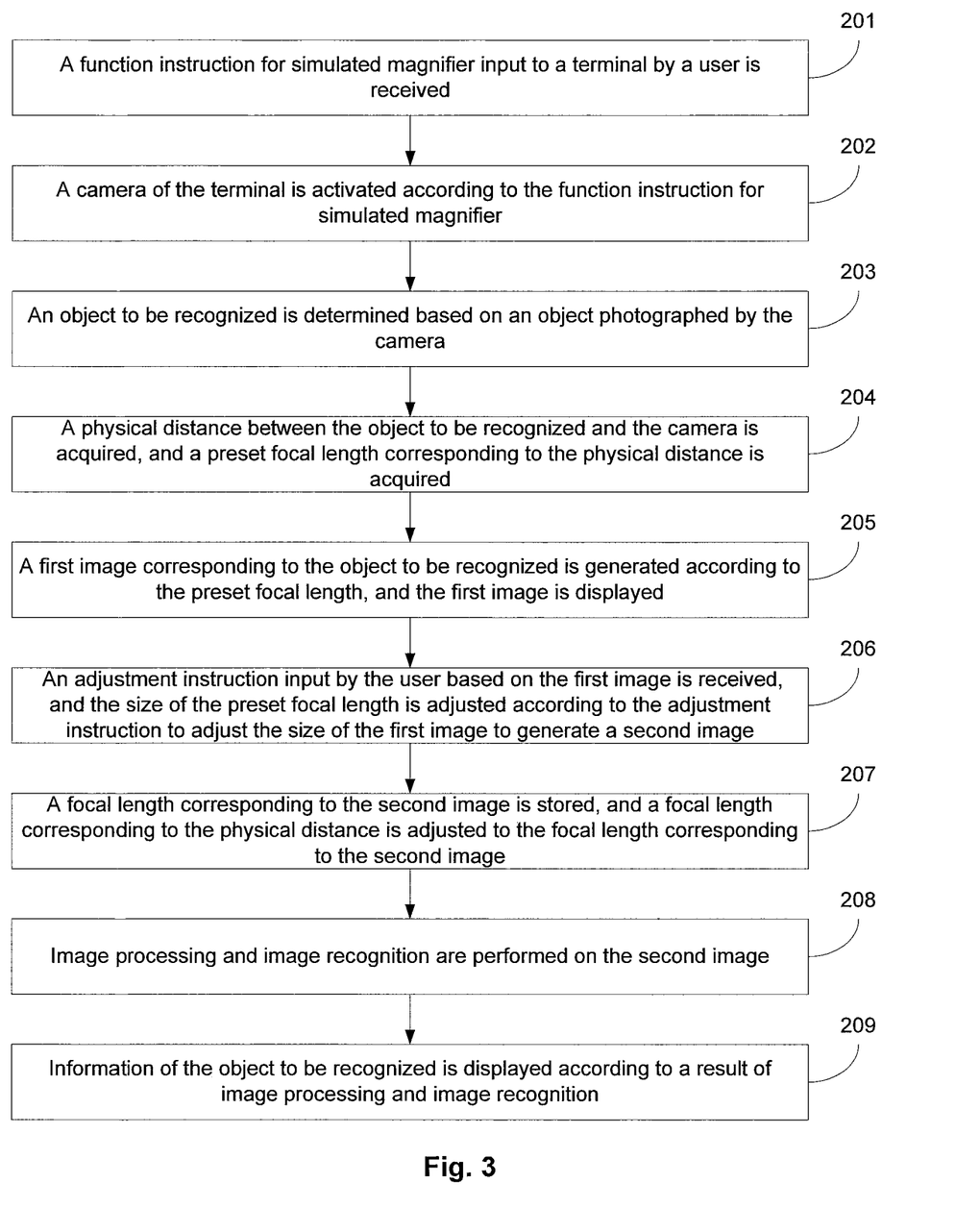
FIG. 3 is a flowchart of a method for terminal-based object recognition according to a second embodiment of the present disclosure.

Please refer to FIG. 3. FIG. 3 is a flowchart of a method for terminal-based object recognition according to a second embodiment of the present disclosure. As shown in FIG. 3, the method includes:

Step 201: A function instruction for simulated magnifier input to a terminal by a user is received.

Step 202: A camera of the terminal is activated according to the function instruction for simulated magnifier.

Step 203: An object to be recognized is determined based on an object photographed by the camera.

Step 204: A physical distance between the object to be recognized and the camera is acquired, and a preset focal length corresponding to the physical distance is acquired.

Step 205: A first image corresponding to the object to be recognized is generated according to the preset focal length, and the first image is displayed.

For the above steps 201 to 205, reference may be made to the description of the above method embodiments, and details are not described here again.

Step 206: An adjustment instruction input by the user based on the first image is received, and the size of the preset focal length is adjusted according to the adjustment instruction to adjust the size of the first image to generate a second image.

Step 207: A focal length corresponding to the second image is stored, and the focal length corresponding to the physical distance is adjusted to the focal length corresponding to the second image.

Step 208: Image processing and image recognition are performed on the second image.

Step 209: Information of the object to be recognized is displayed according to a result of image processing and image recognition.

In the present embodiments, when the user is not very satisfied with a picture displayed by the first image, the first image may be magnified or reduced to make the picture presented by the first image satisfy the demand of the user.

The user may input the adjustment instruction by operating a volume key on the terminal, and the user may also input the adjustment instruction by a sliding operation of the finger on the terminal screen. For example, two fingers slide close to each other to indicate that the first image is reduced, and two fingers slide away from each other to indicate that the first image is magnified. The user may also input the adjustment instruction by voice. The adjustment instruction may also be input by other means, and no limitation is imposed here.

The adjustment instruction specifically refers to adjusting the size of the focal length to adjust the size of the first image.

When the adjusted second image satisfies the demand of the user, a focal length corresponding to the second image is stored, and the focal length is set to a focal length corresponding to the current physical distance. When the same physical distance is encountered next time, it is directly defaulted that the focal length is the focal length corresponding to the physical distance, so that the user does not need to adjust again.

In the present embodiments, image processing and image recognition are performed on the second image, and the process and the image processing and image recognition process on the first image are based on the same inventive concept. Specifically, reference may be made to the description in the above embodiments.

Correspondingly, the recognition result of the second image is fed back to the user on the terminal screen.

The embodiments of the present disclosure provide a method for terminal-based object recognition. A simulated magnifier function is provided on a terminal, an adjustment operation of a user on a focal length of a camera may be accepted, and image processing and image recognition are performed on a magnified image of an object to be recognized to acquire related information of the object to be recognized. In the present implementation mode, on the one hand, a viewing screen may be adjusted in real time according to the viewing experience of the user, the viewing experience of the user is improved, data corresponding to the optimal viewing screen may be memorized, and convenience is provided for the user to use the magnifier function next time. On the other hand, it helps the user to thoroughly understand related information of an object to be recognized, thereby improving the user experience.

Figure 4:
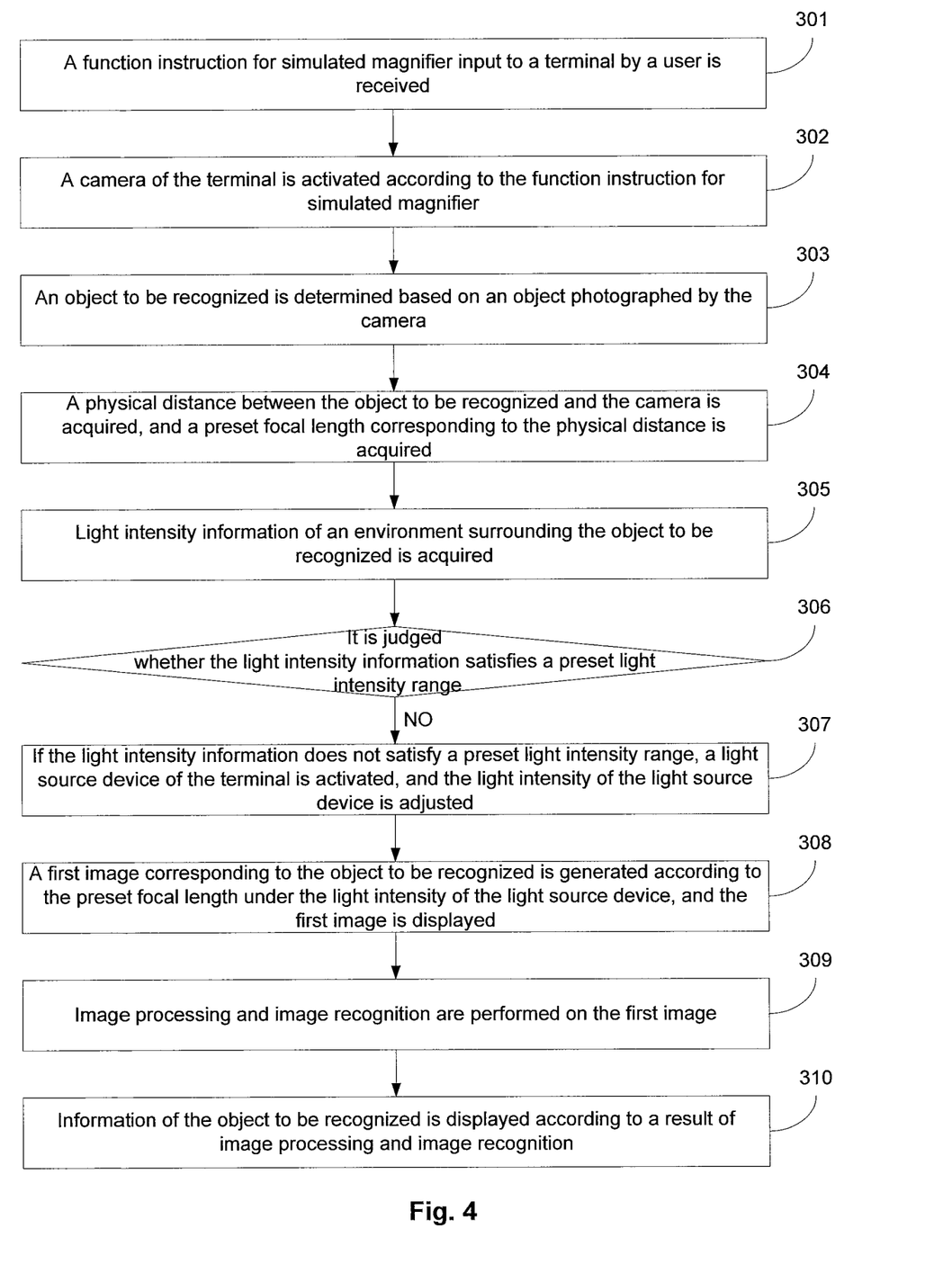
FIG. 4 is a flowchart of a terminal-based object recognition method according to a third embodiment of the present disclosure.

Please refer to FIG. 4. FIG. 4 is a flowchart of a terminal-based object recognition method according to a third embodiment of the present disclosure. As shown in FIG. 4, the method includes:

Step 301: A function instruction for simulated magnifier input to a terminal by a user is received.

Step 302: A camera of the terminal is activated according to the function instruction for simulated magnifier.

Step 303: An object to be recognized is determined based on an object photographed by the camera.

Step 304: A physical distance between the object to be recognized and the camera is acquired, and a preset focal length corresponding to the physical distance is acquired.

For the above steps 301 to 304, reference may be made to the description of the first method embodiment, and details are not described here again.

Step 305: Light intensity information of an environment surrounding the object to be recognized is acquired.

Step 306: It is judged whether the light intensity information satisfies a preset light intensity range.

Step 307: If the light intensity information does not satisfy a preset light intensity range, a light source device of the terminal is activated, and the light intensity of the light source device is adjusted.

Step 308: A first image corresponding to the object to be recognized is generated according to the preset focal length under the light intensity of the light source device, and the first image is displayed.

Step 309: Image processing and image recognition are performed on the first image.

Step 310: Information of the object to be recognized is displayed according to a result of image processing and image recognition.

It can be understood that if the light of a current application scene is dark, an image photographed by the camera is unclear at this time, and the result of image recognition is inaccurate. Therefore, in the present embodiments, the light intensity of an environment in which the object to be recognized is located is adjusted.

In the present embodiments, the light intensity of the surrounding environment may be detected by a photosensitive sensor provided on the terminal. The light intensity is compared with a preset light intensity range, if the light intensity value is within the preset light intensity range, adjustment is not performed, and if the light intensity value is not within the preset light intensity range, adjustment is performed. Specifically, the light source device on the terminal is activated. Further, the intensity of light emitted by the light source device may be adjusted according to the detected light intensity of the surrounding environment, so that the surrounding light intensity is within the preset light intensity range.

Thus, in a suitable light intensity environment, a first image is generated based on the preset focal length. For a detailed process of performing image processing and image recognition on the first image, reference may be made to the description in the above embodiments.

The embodiments of the present disclosure provide a method for terminal-based object recognition. A simulated magnifier function is provided on a terminal, when an object to be recognized is viewed by using the simulated magnifier function, the light intensity of a surrounding environment is also adjusted to make an image photographed from the object to be recognized clearly displayed on a terminal screen, and image processing and image recognition are performed on the image photographed after adjusting the light intensity to acquire related information of the object to be recognized. The implementation mode not only solves the problem that a photographed image is unclear due to the darkness of the light intensity, but also helps the user to thoroughly understand related information of an object, thereby improving the user experience.

Figure 5:
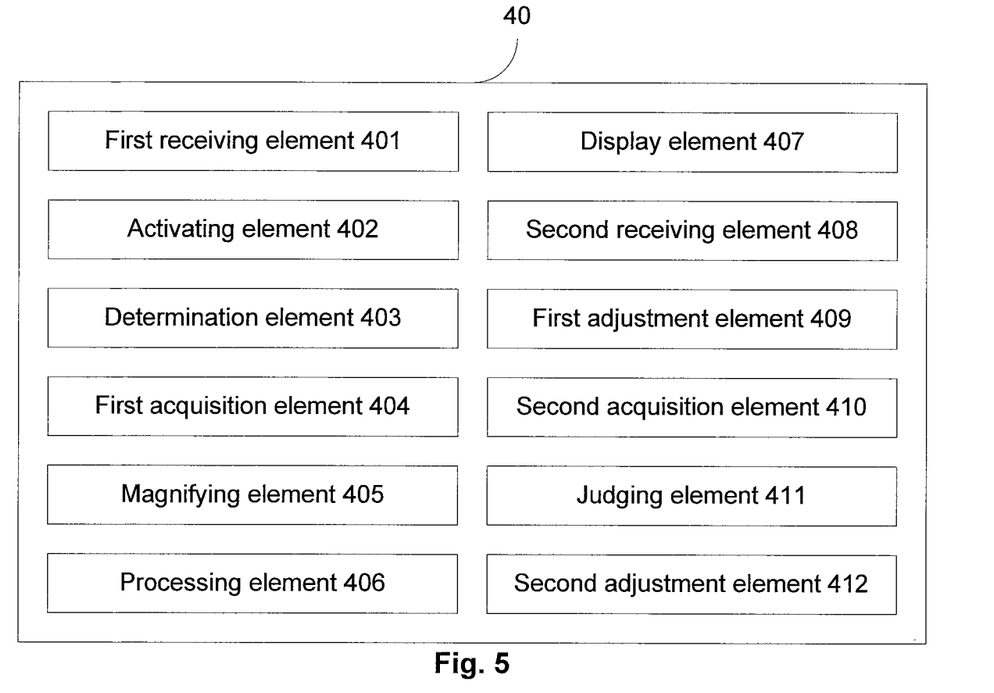
FIG. 5 is a schematic diagram of a device for terminal-based object recognition according to some embodiments of the present disclosure.

Please refer to FIG. 5. FIG. 5 is a schematic diagram of a device for terminal-based object recognition according to some embodiments of the present disclosure. As shown in FIG. 5, the device 40 includes a first receiving element 401, an activating element 402, a determination element 403, a first acquisition element 404, a magnifying element 405, a processing element 406, and a display element 407.

The first receiving element 401 is configured to receive a function instruction for simulated magnifier input to a terminal by a user. The activating element 402 is configured to activate a camera of the terminal according to the function instruction for simulated magnifier. The determination element 403 is configured to determine an object to be recognized based on an object photographed by the camera. The first acquisition element 404 is configured to acquire a physical distance between the object to be recognized and the camera, and acquire a preset focal length corresponding to the physical distance. The magnifying element 405 is configured to generate, according to the preset focal length, a first image corresponding to the object to be recognized, and display the first image. The processing element 406 is configured to perform image processing and image recognition on the first image. The display element 407 is configured to display information of the object to be recognized at the terminal according to a result of image processing and image recognition.

In some embodiments, when the object photographed by the camera includes at least two objects, the determination element 403 is configured to receive an object indication instruction input to the terminal by the user, and determine the object to be recognized according to the object indication instruction.

In some embodiments, when the object to be recognized is a plant or an animal, the displayed information of the object to be recognized includes a name, a category, a growth habit, a habitat distribution, and a cultivation method.

In some embodiments, before performing image processing and image recognition on the first image, referring to FIG. 5, the device further includes a second receiving element 408 and a first adjustment element 409.

The second receiving element 408 is configured to receive an adjustment instruction input by the user based on the first image, and adjust the size of the preset focal length according to the adjustment instruction to adjust the size of the first image to generate a second image. The first adjustment element 409 is configured to store a focal length corresponding to the second image, and adjust the focal length corresponding to the physical distance to the focal length corresponding to the second image. At this time, the processing element 406 is configured to perform image processing and image recognition on the second image.

In some embodiments, after acquiring the physical distance between the object to be recognized and the camera and acquiring the preset focal length corresponding to the physical distance, referring to FIG. 5, the device further includes a second acquisition element 410, a judging element 411 and a second adjustment element 412.

The second acquisition element 410 is configured to acquire light intensity information of an environment surrounding the object to be recognized. The judging element 411 is configured to judge whether the light intensity information satisfies a preset light intensity range. The second adjustment element 412 is configured to activate, if the light intensity information does not satisfy the preset light intensity range, a light source device of the terminal, and adjust the light intensity of the light source device. At this time, the magnifying element 405 is configured to generate, according to the preset focal length, the first image corresponding to the object to be recognized under the light intensity of the light source device, and display the first image.

It is to be noted that since the information interaction, the execution process and the like between the elements in the device are based on the same concept as the method embodiments of the present disclosure, details may refer to the description in the method embodiments of the present disclosure, and will not be described here again.

The embodiments of the present disclosure provide a device for terminal-based object recognition. A simulated magnifier function is provided on a terminal, and image processing and image recognition are performed on a magnified image of an object to be recognized, thereby acquiring related information of the object to be recognized. The implementation mode not only facilitates object viewing by a user, but also helps the user to thoroughly understand related information of an object, thereby improving the user experience.

Figure 6:
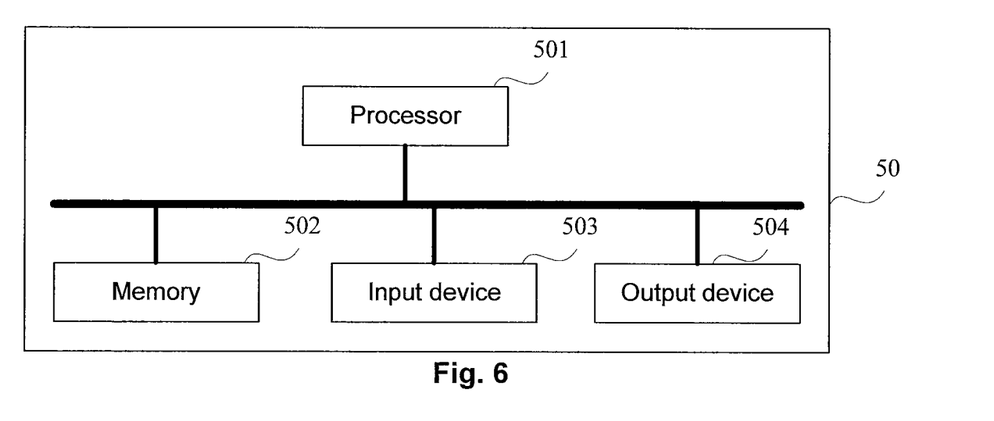
FIG. 6 is a schematic diagram of a hardware structure of an electronic device for performing the method for terminal-based object recognition according to some embodiments of the present disclosure.

Referring to FIG. 6, FIG. 6 is a schematic diagram of a hardware structure of an electronic device for performing the method for terminal-based object recognition according to some embodiments of the present disclosure. As shown in FIG. 6, the electronic device 50 includes:

one or more processors 501 and a memory 502, as exemplified by one processor 501 in FIG. 6.

The processor 501 and the memory 502 may be connected by a bus or other means, as exemplified by a bus connection in FIG. 6.

The device for performing the method for terminal-based object recognition may further include: an input device 503 and an output device 504.

The memory 502 is used as a non-volatile computer-readable storage medium, and may be configured to store non-volatile software programs, non-volatile computer-executable programs, and elements, such as program instructions/elements (for example, the first receiving element 401, the activating element 402, the determination element 403, the first acquisition element 404, the magnifying element 405, the processing element 406, and the display element 407 shown in FIG. 5) corresponding to the method for terminal-based object recognition in some embodiments of the present disclosure. The processor 501 executes various functional applications of the server and data processing by executing non-volatile software programs, instructions and elements stored in the memory 502, that is, implementing the method for terminal-based object recognition of the above method embodiments.

The memory 502 may include a storage program area and an storage data area, wherein the storage program area may store an operating system and an application required for at least one function; and the storage data area may store data created according to usage of the device for terminal-based object recognition, and the like. In addition, the memory 502 may include a high-speed RAM, and may further include a non-volatile memory such as a disk storage device, a flash device, or other non-volatile solid storage devices. In some embodiments, the memory 502 optionally includes memories remotely located relative to the processor 501, which may be connected to the device for terminal-based object recognition over a network. The examples of such networks include, but are not limited to, the Internet, the Intranet, local area networks, mobile communication networks, and combinations thereof.

The input device 503 may receive input digital or character information and generate a key signal input related to user settings and function control of the device for terminal-based object recognition. The output device 504 may include a display device such as a display screen.

The one or more elements are stored in the memory 502, and when executed by the one or more processors 501, the method for terminal-based object recognition in any of the above method embodiments is performed. For example, the above described method step 101 to step 107 in FIG. 1, method step 1031 in FIG. 2, method step 201 to step 209 in FIG. 3, and method step 301 to step 310 in FIG. 4 are performed, and element 401 to element 412 in FIG. 5 are implemented.

The above products may perform the methods provided by the embodiments of the present disclosure, and have the corresponding functional elements and beneficial effects of the execution method. For technical details that are not described in detail in the present embodiments, reference may be made to the method provided by the embodiments of the present disclosure.

The electronic device of some embodiments of the present disclosure exists in various forms, including but not limited to:

(1) mobile communication devices: these devices are characterized by having a mobile communication function and are mainly aimed at providing voice and data communication. Such terminals include: smart phones (such as iPhone), multimedia phones, functional phones, and low-end phones.

(2) Ultra-mobile personal computer devices: such devices belong to personal computers, having computing and processing functions, and generally having the characteristic of mobile Internet access. Such terminals include: PDAs, MIDs, and UMPC devices, such as iPad.

(3) Other electronic devices having a data interaction function.

Some embodiments of the present disclosure provide a non-volatile computer-readable storage medium which stores computer-executable instructions that are executed by an electronic device to perform the method for terminal-based object recognition in any of the above method embodiments. For example, the above described method step 101 to step 107 in FIG. 1, method step 1031 in FIG. 2, method step 201 to step 209 in FIG. 3, and method step 301 to step 310 in FIG. 4 are performed, and element 401 to element 412 in FIG. 5 are implemented.

Some embodiments of the present disclosure provide a computer program product, including a computing program stored on a non-volatile computer-readable storage medium, the computer program includes program instructions, and when the program instructions are executed by a computer, the computer performs the method for terminal-based object recognition in any of the above method embodiments. For example, the above described method step 101 to step 107 in FIG. 1, method step 1031 in FIG. 2, method step 201 to step 209 in FIG. 3, and method step 301 to step 310 in FIG. 4 are performed, and element 401 to element 412 in FIG. 5 are implemented.

Some embodiments of the present disclosure provide a storage medium, which includes a stored program. When the program is running, a device where the storage medium is located may be controlled to perform the above method for terminal-based object recognition.

Some embodiments of the present disclosure provide a processor, which is configured to run a program. The program is running to perform the above method for terminal-based object recognition.

The device embodiments described above are merely illustrative, wherein the elements described as separate components may or may not be physically separated, and the components displayed as elements may or may not be physical elements, which may be located in one place or distributed to multiple network elements. Some or all of the elements may be selected according to actual needs to achieve the purpose of the solution of the present embodiments.

Through the description of the above implementation modes, those of ordinary skill in the art can clearly understand that each implementation mode may be implemented by means of software plus a necessary general hardware platform, and of course, may also be implemented through hardware. Those skilled in the art can understand that all or part of the processes in the above method embodiments may be implemented by a computer program to instruct related hardware, and the program may be stored in a computer-readable storage medium. When the program is executed, the flow of each method embodiments as described above may be included. The storage medium may be a magnetic disk, an optical disk, a Read-Only Memory (ROM), or a Random Access Memory (RAM).

Finally, it is to be noted that the above embodiments are only used to illustrate the technical solutions of the present disclosure, and are not limited thereto. The technical features in the above embodiments or different embodiments may also be combined under the concept of the present disclosure, the steps may be implemented in any order, there are many other variations of different aspects of the present disclosure as described above, and for the sake of brevity, they are not provided in the details. Although the present disclosure has been described in detail with reference to the foregoing embodiments, those skilled in the art should understand that the technical solutions described in the foregoing embodiments are modified, or some technical features are equivalently replaced, but the modifications and replacements do not make the essence of the corresponding technical solutions depart from the scope of the technical solutions of various embodiments of the present disclosure.

What is claimed is:

1. A method for terminal-based object recognition method, comprising:
    receiving a function instruction for simulated magnifier input to a terminal by a user;
    activating a camera of the terminal according to the function instruction for simulated magnifier;
    determining an object to be recognized based on an object photographed by the camera;
    acquiring a physical distance between the object to be recognized and the camera, and acquiring a preset focal length corresponding to the physical distance;
    generating, according to the preset focal length, a first image corresponding to the object to be recognized, and displaying the first image;
    performing image processing and image recognition on the first image; and
    displaying information of the object to be recognized according to a result of image processing and image recognition.

2. The method according to claim 1, wherein when the object photographed by the camera comprises at least two objects, determining the object to be recognized comprises:
    receiving an object indication instruction input to the terminal by the user, and determining the object to be recognized from the at least two objects according to the object indication instruction.

3. The method according to claim 1, wherein before performing image processing and image recognition on the first image, the method further comprises:
    receiving an adjustment instruction input by the user based on the first image, and adjusting the size of the preset focal length according to the adjustment instruction to adjust the size of the first image to generate a second image; and
    storing a focal length corresponding to the second image, and adjusting the focal length corresponding to the physical distance to the focal length corresponding to the second image; and
    performing image processing and image recognition on the first image specifically comprises: performing image processing and image recognition on the second image.

4. The method according to claim 1, wherein after acquiring the physical distance between the object to be recognized and the camera and acquiring the preset focal length corresponding to the physical distance, the method further comprises:
    acquiring light intensity information of an environment surrounding the object to be recognized;
    judging whether the light intensity information satisfies a preset light intensity range; and
    if the light intensity information does not satisfy the preset light intensity range, activating a light source device of the terminal, and adjusting the light intensity of the light source device; and
    generating, according to the preset focal length, the first image corresponding to the object to be recognized and displaying the first image comprises: generating, according to the preset focal length, the first image corresponding to the object to be recognized under the light intensity of the light source device, and displaying the first image.

5. The method according to claim 1, wherein the object to be recognized is a plant or an animal,
    the displayed information of the object to be recognized comprises a name, a category, a growth habit, a habitat distribution, and a cultivation method.

6. A device for terminal-based object recognition, comprising:
    a first receiving element, configured to receive a function instruction for simulated magnifier input to a terminal by a user;
    an activating element, configured to activate a camera of the terminal according to the function instruction for simulated magnifier;
    a determination element, configured to determine an object to be recognized based on an object photographed by the camera;
    a first acquisition element, configured to acquire a physical distance between the object to be recognized and the camera, and acquire a preset focal length corresponding to the physical distance;
    a magnifying element, configured to generate, according to the preset focal length, a first image corresponding to the object to be recognized, and display the first image;
    a processing element, configured to perform image processing and image recognition on the first image; and
    a display element, configured to display information of the object to be recognized at the terminal according to a result of image processing and image recognition.

7. The device according to claim 6, wherein when the object photographed by the camera comprises at least two objects,
    the determination element is configured to receive an object indication instruction input to the terminal by the user, and determine the object to be recognized from the at least two objects according to the object indication instruction.

8. The device according to claim 6, wherein before performing image processing and image recognition on the first image, the device further comprises:
    a second receiving element, configured to receive an adjustment instruction input by the user based on the first image, and adjust the size of the preset focal length according to the adjustment instruction to adjust the size of the first image to generate a second image; and
    a first adjustment element, configured to store a focal length corresponding to the second image, and adjust the focal length corresponding to the physical distance to the focal length corresponding to the second image; and the processing element is configured to perform image processing and image recognition on the second image.

9. The device according to claim 6, wherein after acquiring the physical distance between the object to be recognized and the camera and acquiring the preset focal length corresponding to the physical distance, the device further comprises:

a second acquisition element, configured to acquire light intensity information of an environment surrounding the object to be recognized;

a judging element, configured to judge whether the light intensity information satisfies a preset light intensity range; and a second adjustment element, configured to activate, if the light intensity information does not satisfy the preset light intensity range, a light source device of the terminal, and adjust the light intensity of the light source device; and the magnifying element is configured to generate, according to the preset focal length, the first image corresponding to the object to be recognized under the light intensity of the light source device, and display the first image.

10. The device according to claim 6, wherein the object to be recognized is a plant or an animal, the displayed information of the object to be recognized comprises a name, a category, a growth habit, a habitat distribution, and a cultivation method.

11. An electronic device, comprising:

at least one processor; and a memory communicatively connected to the at least one processor, wherein the memory stores an instruction executable by the at least one processor, and the instruction is executed by the at least one processor such that the at least one processor performs the method according to claim 1.

12. The method according to claim 2, wherein the object to be recognized is a plant or an animal, the displayed information of the object to be recognized comprises a name, a category, a growth habit, a habitat distribution, and a cultivation method.

13. The method according to claim 3, wherein the object to be recognized is a plant or an animal, the displayed information of the object to be recognized comprises a name, a category, a growth habit, a habitat distribution, and a cultivation method.

14. The method according to claim 4, wherein the object to be recognized is a plant or an animal, the displayed information of the object to be recognized comprises a name, a category, a growth habit, a habitat distribution, and a cultivation method.

15. The device according to claim 7, wherein the object to be recognized is a plant or an animal, the displayed information of the object to be recognized comprises a name, a category, a growth habit, a habitat distribution, and a cultivation method.

16. The device according to claim 8, wherein the object to be recognized is a plant or an animal, the displayed information of the object to be recognized comprises a name, a category, a growth habit, a habitat distribution, and a cultivation method.

17. The device according to claim 9, wherein the object to be recognized is a plant or an animal, the displayed information of the object to be recognized comprises a name, a category, a growth habit, a habitat distribution, and a cultivation method.

* * * * *